Oct. 18, 1949.  K. E. LYMAN  2,485,500
MOTOR VEHICLE FRAME CONSTRUCTION
Filed March 24, 1947  3 Sheets-Sheet 1

INVENTOR
KENNETH E. LYMAN
BY
Toulmin & Toulmin
ATTORNEYS

Oct. 18, 1949. K. E. LYMAN 2,485,500
MOTOR VEHICLE FRAME CONSTRUCTION
Filed March 24, 1947 3 Sheets-Sheet 2

INVENTOR
KENNETH E. LYMAN
BY
Toulmin & Toulmin
ATTORNEYS

Oct. 18, 1949. K. E. LYMAN 2,485,500
MOTOR VEHICLE FRAME CONSTRUCTION
Filed March 24, 1947 3 Sheets-Sheet 3

INVENTOR
KENNETH E. LYMAN
BY
Toulmin & Toulmin
ATTORNEYS

Patented Oct. 18, 1949

2,485,500

UNITED STATES PATENT OFFICE 2,485,500

MOTOR VEHICLE FRAME CONSTRUCTION

Kenneth E. Lyman, Lake Forest, Ill., assignor to Tucker Corporation, Chicago, Ill., a corporation of Delaware Application March 24, 1947, Serial No. 736,840

8 Claims. (Cl. 280—106)

The present invention relates to motor vehicles and is concerned primarily with the frame construction commonly called the chassis.

It has been the practice in the field of automotive engineering to provide a frame or chassis which may be generally characterized as comprising spaced side bars that extend longitudinally of the vehicle and cross bars. The floor of the car is built over this structure.

An important object of the present invention is to simplify the frame construction. This is achieved by employing as the floor board a steel plate having raised portions and depressed portions whereby a channel structure is defined which has required properties of strength and rigidity. This floor board is anchored at each side to the side bars, and there is then no need for the cross bars in the main body of the car as this floor plate performs the function previously attributed to the cross bars.

In providing a frame in accordance with the principles of this invention, the hood or cowl at the front must be accommodated. Accordingly, a further object is to provide a motor vehicle frame of the type indicated which includes side bars having inwardly offset portions at the end which are joined to the main part of the side bars by bends or curved structures. This defines a narrow chassis structure at the front on which the hood or cowl is mounted.

Following well accepted principles of automotive engineering, the front part of the floor plate is disposed at an angle. A frame designed in accordance with this invention will have this inclined part of the floor plate located just at the bends in the side bars. With this condition in mind a further object is to provide a structural arrangement for assembling the floor plate with the side bars at this point. Inasmuch as channel beams are usually employed as the side bars, the floor plate is slotted to accommodate flanges of the channel side bars.

Yet another object of the invention is to provide, in a motor vehicle frame of the character above noted, a narrow frame construction at the rear for accommodating an engine mounted in the rear. In some respects this narrow construction at the rear corresponds to the narrow construction at the front.

A further somewhat more detailed object is to provide on the narrow construction at the front a new and improved supporting structure for grille work.

Various other more detailed objects and advantages of the invention such as arise in connection with carrying out the above noted ideas in a practical embodiment will in part become apparent and in part be hereinafter stated as the description of the invention proceeds.

The invention, therefore, comprises a motor vehicle framework consisting of spaced longitudinal side bars having offset portions at each end defining narrow frame structures thereat, with a floor plate of channel construction having its side edges anchored to the side bars of the main part thereof, and a supporting structure for a grille work on the narrow framework at the front.

For a full and more complete understanding of the invention reference may be had to the following description and accompanying drawings wherein.

Figure 1:
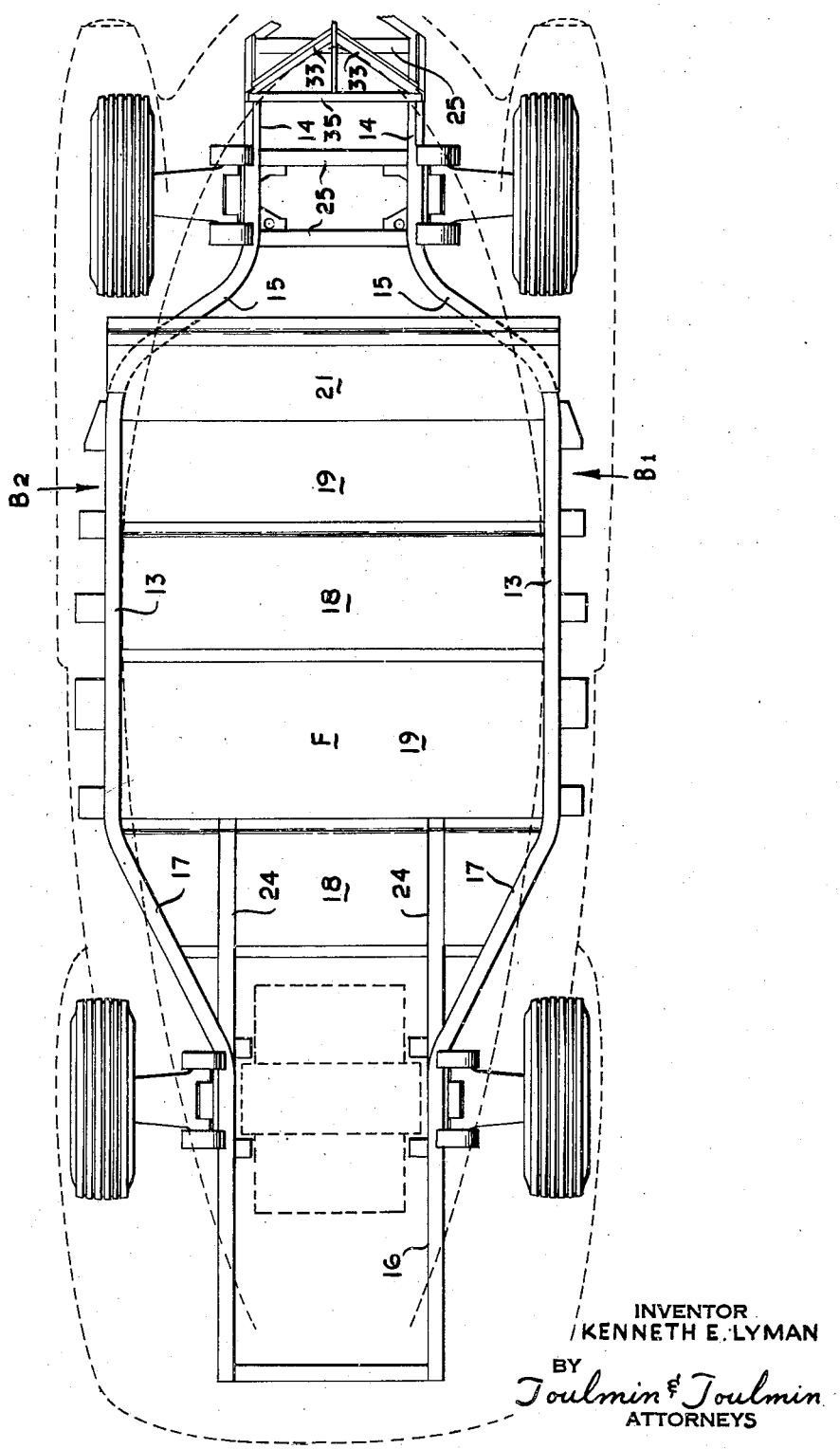
Figure 1 is a plan view of a motor vehicle chassis designed in accordance with precepts of this invention. In this view the main body of the vehicle is shown in dotted lines.

Referring now to the drawings wherein like reference characters denote corresponding parts, a chassis or frame for a motor vehicle is shown as comprising side bars $B_1$ and $B_2$. Each of these bars is of a well known channel construction so as to offer required properties of strength and rigidity while holding weight down to a minimum. Upon referring to Figure 2 it will be seen that each of the bars $B_1$ and $B_2$ includes an upper flange 10 and a lower flange 11 which are joined by a vertical web 12. Again referring to Figure 1 it will be seen that each of the side bars $B_1$ and $B_2$ includes a main body part 13 which is substantially coextensive with the length of the car body. Each of the side bars B also includes an inner offset part at one end designated 14 and which is joined to the main part 13 by the bend 15. Likewise, at the rear end of the car each side bar $B_1$ and $B_2$ includes an inwardly offset end part 16 which is joined to the main part 13 by an intermediate inclined section 17.

A floor plate, as referred to in its entirety by the reference character F, comprises upraised panels 18 and depressed panels 19, the upraised panels being alternately disposed and connected by vertical walls 20. It is evident that these panels 18 and 19 and the vertical walls 20 define a channel structure which presents good properties of strength and rigidity. It is further notable that at each side the panels 18 and 19 fit between the flanges 10 and 11 of the side bars $B_1$ and $B_2$. When so assembled the floor plate F is secured to the side bars as by welding.

Figure 2:
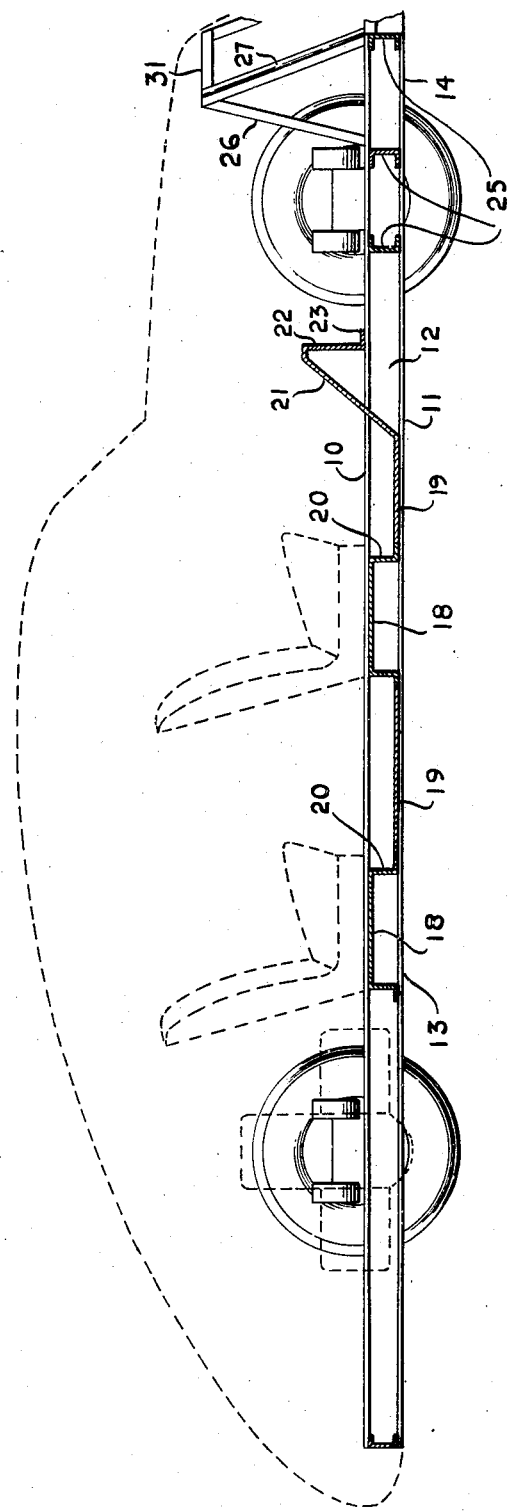
Figure 2 is a view in side elevation of the frame, with parts of the car in dotted lines.

Upon referring to Figure 2 it will be noted that the floor plate F includes an inclined foot board 21 which is integrally connected to the depressed panel 19 at the front. With this construction present at the bends 15, it is necessary to provide slots in the floor board 21 which accommodates the upper flanges 10 of the side bars. The foot board 21 is continued up above the top flange 10 and then takes the form of an L-shaped cross bar 22 having a flange 23 resting on the upper surface of the side bars $B_1$ and $B_2$ to which it may be welded.

As further brought out in Figure 2, it will be noted that the chassis is designed to have the seats, which are shown in dotted lines, rest on the upraised panels 18 while the depressed panels 19 accommodate the feet of the sitters and afford comfortable leg room.

Upon again referring to Figure 1, it will be noted that longitudinal supporting struts 24 extend inwardly on the inner ends of the inclined parts 17 to the floor plate F, these structures being substantially continuations of the offset portions 16 of the side bars. This structure accommodates the engine which is represented by broken lines in Figure 1.

Figure 3:
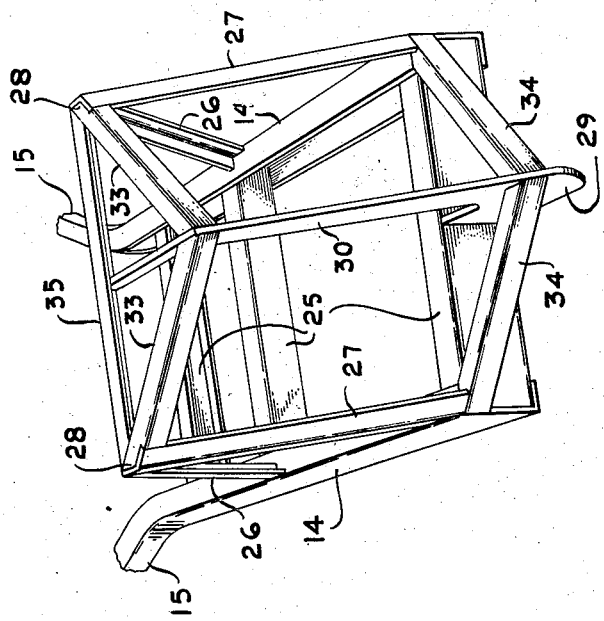
Figure 3 is an enlarged detailed perspective of the front framework and grille support.
Figure 4:
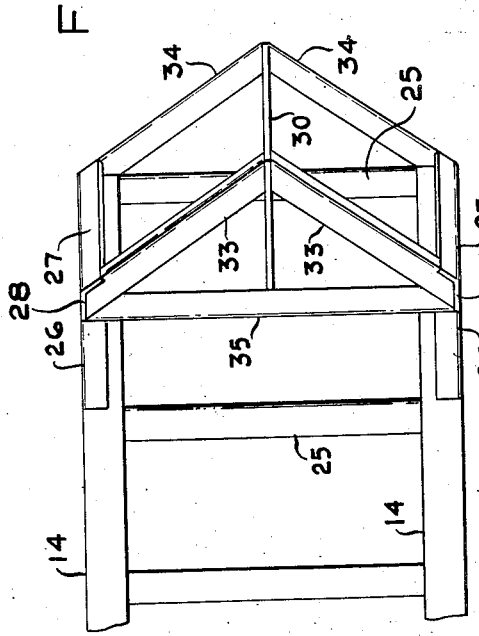
Figure 4 is a fragmentary top plan view of the front framework, bringing out the construction of the grille support.
Figure 5:
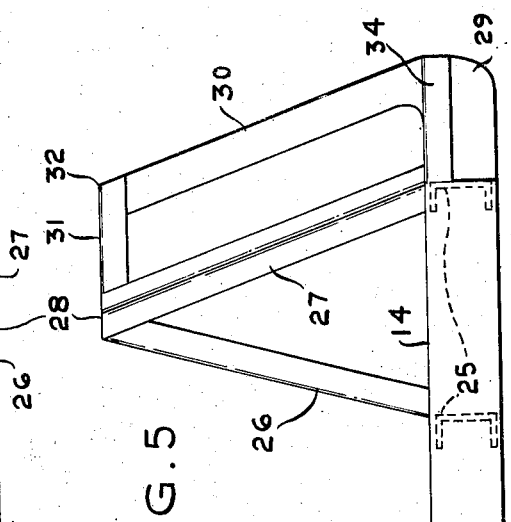
Figure 5 is a detailed showing in side elevation of the grille work support.

Referring now more particularly to Figures 3, 4 and 5, it will be noted that cross channel bars 25 extend between the offset portions 14 of the side bars $B_1$ and $B_2$. There are three of these cross bars 25, one being located adjacent the free ends of the side bars, the other adjacent to the bends 15, and the third one in an intermediate position. These three cross bars with the parts 14 of the bars B define the framework at the front which supports the hood or cowl and the grille work. The grille work support is further shown as comprising inclined uprights 26 and 27 which meet at an apex 28 and which are spaced at their bottom ends where they are joined to the respective part 14. There is one of the inclined uprights 26 at each side, just as there is one of the inclined uprights 27 at each side. Extending forwardly from the front cross bar 25 and centrally thereof is a web 29 with which is integrally joined another inclined upright 30. A top horizontal bar 31 is connected to a cross piece 35 which extends between the apexes 28 and at the other end with the upper end of the bar 30, the latter connection being represented at the corner 32. A diagonal brace 33 extends from each apex 28 to this corner 32 and another pair of diagonal braces 34 is located at the bottom, each of the braces 34 being connected at one end to the foot of the upright 27 and at its other to the forward part of the web 29.

It is evident that a grille work may readily be assembled on and adequately supported from this structure on the front part of the car comprising the rectangular framework 14—25, from which upstand the supporting structure 26 to 35 inclusive.

While a preferred specific embodiment of the invention is hereinbefore set forth, it is to be clearly understood that the invention is not to be limited to the exact constructions illustrated and described, because various modifications of these details may be provided in putting the invention into practice within the purview of the appended claims.

What is claimed is:

1. In a motor vehicle frame, a grille work support comprising a narrow frame structure disposed substantially on a horizontal plane, a triangular support upstanding from each side of said horizontal frame, an upper triangular support having corners connected to the upper corner of said upright triangular supports, a lower horizontal support extending forwardly of said frame substantially on the plane thereof, and an inclined upright connecting the apexes of said upper and lower triangular supports.

2. In a motor vehicle frame including a narrow portion at one end, a pair of triangular supports having their bases connected to said narrow portion and upstanding therefrom, a structural element joining the apexes of said triangular supports, a triangular structural element extending forwardly of said narrow portion and having its base joined thereto, and an inclined vertical upright connecting the apex of said last mentioned triangular support to said structural element.

3. In a motor vehicle frame including a narrow front portion, a triangular support disposed in the plane of said narrow portion and having its base at the free end thereof, an upper triangular support substantially parallel but offset vertically with respect to said lower triangular support, and means for supporting said upper triangular support from said narrow portion of the frame.

4. In a motor vehicle frame including a narrow front portion, a triangular support disposed in the plane of said narrow portion and having its base at the free end thereof, an upper triangular support substantially parallel but offset vertically with respect to said lower triangular support, means for supporting said upper triangular support from said narrow portion of the frame, and an inclined vertical upright joining the apexes of said triangular support.

5. In a motor vehicle framework, a pair of side bars spaced apart to define a main body section and having inwardly offset end portions defining narrow extensions of the main body section at the front and rear ends, parts extending between the side rails to connect them rigidly, a pair of triangular supports having their bases connected to the narrow extension at the front end and upstanding therefrom, an upper generally horizontal triangular support having corners connected to the upper ends of the pair of triangular supports, a lower generally horizontal triangular support extending forwardly of the forward extension substantially in the plane thereof, and an upright connecting the forward corners of the upper and lower supports.

6. In a motor vehicle framework, a pair of side bars spaced apart to define a main body section and having inwardly offset end portions defining narrow extensions of the main body section at the front and rear ends, a channel shaped floor plate extending across the main body section and having its side edges connected to the side bars, cross bars connecting the side bars at the narrow extensions, a pair of triangular supports having their bases connected to the narrow extension at the front end and upstanding therefrom, an upper generally horizontal triangular support having corners connected to the upper ends of the pair of triangular supports, a lower generally horizontal triangular support extending forwardly of the forward extension substantially in the plane thereof, and an upright connecting the forward corners of the upper and lower supports.

7. In a motor vehicle framework, a pair of channel shaped side bars spaced apart with their open sides facing, a floor plate having adjacent upraised and depressed panels extending transversely across said body to define intermediate web portions, the upraised panels of said floor plate being anchored to the upper edges of said channel shaped side bars and the depressed panels of said floor plate being anchored to the lower edges of said channel shaped side bars.

8. In a motor vehicle framework, a pair of channel shaped side bars spaced apart with their open sides facing, a floor plate having adjacent upraised and depressed panels extending transversely across said body to define intermediate web portions, the upraised panels of said floor plate being anchored to the upper edges of said channel shaped side bars and the depressed panels of said floor plate being anchored to the lower edges of said side bars, and an inclined foot board joined at one edge to one of said depressed panels to form an extension thereof and formed with slots to receive the upper edges of said channel shaped side bars.

KENNETH E. LYMAN.

REFERENCES CITED

The following references are of record in the file of this patent:

UNITED STATES PATENTS

| Number | Name | Date |
| --- | --- | --- |
| 1,876,905 | Freeman et al. | Sept. 13, 1932 |
| 2,078,679 | Golphin | Apr. 27, 1937 |
| 2,100,561 | Kliesrath | Nov. 30, 1937 |
| 2,111,563 | Kliesrath | Mar. 22, 1938 |
| 2,165,648 | Oswald | July 11, 1939 |
| 2,188,879 | Ledwinka | Jan. 30, 1940 |
| 2,220,272 | Pitura et al. | Nov. 5, 1940 |
| 2,230,448 | Best | Feb. 4, 1941 |

FOREIGN PATENTS

| Number | Country | Date |
| --- | --- | --- |
| 525,792 | Great Britain | Mar. 1, 1939 |